United States Patent [19]
Bian et al.

[11] Patent Number: 5,576,712
[45] Date of Patent: Nov. 19, 1996

[54] METHOD AND DEVICE FOR THE ELIMINATION OF THE INTERMEDIATE FREQUENCY FIXED ECHOES IN A COHERENT PULSE RADAR

[75] Inventors: Gilbert Bian, Loperhet; Patrick Garrec, Locmaria; Herve Lemonnier, Renan; Patrick Louedec, Brest, all of France

[73] Assignee: Thomson-CSF, Paris, France

[21] Appl. No.: 425,982

[22] Filed: Apr. 20, 1995

[30] Foreign Application Priority Data

May 3, 1994 [FR] France ................... 94 05374

[51] Int. Cl.$^6$ .................................................. G01S 13/524
[52] U.S. Cl. ................................. 342/160; 342/162
[58] Field of Search ............................. 342/159, 160, 342/162

[56] References Cited

U.S. PATENT DOCUMENTS

| | | | |
|---|---|---|---|
| 4,015,260 | 3/1977 | Campbell, Jr. . | |
| 4,096,478 | 6/1978 | Chavez | 342/132 |
| 4,103,301 | 7/1978 | Evans | 342/93 |
| 4,217,584 | 8/1980 | Lombardi et al. . | |
| 4,222,049 | 9/1980 | Sirven et al. | 342/91 |
| 4,529,985 | 7/1985 | Sawyer et al. | 342/162 |
| 4,542,382 | 9/1985 | Hol | 342/91 |
| 4,688,044 | 8/1987 | O'Brien | 342/160 |
| 4,782,343 | 11/1988 | Marchais | 342/160 |
| 5,061,934 | 10/1991 | Brown et al. | 342/162 |
| 5,291,209 | 3/1994 | Evans et al. | 342/381 |

OTHER PUBLICATIONS

Lee R. Moyer, et al., "Analog Clutter Cancellation Algorithms for Dynamic Range Reduction", IEEE Aerospace and Electronic Systems Magazine, Oct. 1993, No. 10, pp. 10–14.

Primary Examiner—John B. Sotomayor
Attorney, Agent, or Firm—Oblon, Spivak, McClelland, Maier & Neustadt, P.C.

[57] ABSTRACT

The device for the elimination of intermediate frequency echoes from fixed targets carries out the cancellation of the echoes from the fixed targets by the storage, in the form of amplitude and phase samples, of the response to the first pulse of a burst reduced to video band, the synthesis on the basis of these samples of an intermediate frequency replica of the response to the first pulse of a burst and the subtraction of the synthesized replica from each of the subsequent pulses of the burst. It is of the double cancellation type, the preparation of the replica being done in two steps, a first rough-working step in which a rough replica is prepared and a second refining step in which the modelling error of the rough replica is taken into account.

6 Claims, 3 Drawing Sheets

METHOD AND DEVICE FOR THE ELIMINATION OF THE INTERMEDIATE FREQUENCY FIXED ECHOES IN A COHERENT PULSE RADAR

BACKGROUND OF THE INVENTION

1. Field of the Invention

The present invention relates to the detection of moving targets in the presence of fixed targets by means of a radar sending out coherent pulses all of which, in the course of one burst, have the same initial phase shift with respect to their modulation carrier.

2. Description of the Prior Art

In response to an illumination by a burst of coherent pulses, a target returns the burst of pulses as an echo, and preserves or does not preserve their coherence depending on whether it is a fixed target or a moving target. This is because the Doppler effect due to the radial shifting of a target in relation to the pulse source prompts the appearance of a phase shift from pulse to pulse. Thus, the signal received in return, in response to the transmission of each coherent pulse of a burst, which results from the superimposition of responses from fixed and moving targets, has a component that is invariant from pulse to pulse and is due to the fixed targets and a component that fluctuates in phase from one pulse to another and is due to the moving targets.

For the revealing of the moving targets, the invariant component of the reception signal received as an echo of an interrogation pulse due to the illuminated fixed targets is a source of inconvenience. This is all the more so as its level is often higher than that of the variable component of the reception signal due to the moving targets. It is usual to attempt to eliminate it or at least to weaken it before making use of the reception signal, by exploiting the fact that it is found in an identical state in all the echoes in response to the pulses of a burst while the component due to the moving targets fluctuates in phase from one echo to another. In one standard method, before exploiting the received signal and processing it to separate the targets in terms of distance and possibly speed, a subtraction is made, from the signal received in response to the transmission of a pulse, of the signal received in response to a previously transmitted pulse. This operation, which enables the elimination of the fixed echoes, is generally done by means of a delay line, which delays the reception signal by one pulse repetition period, and a subtractor. The delay line may be an analog line. It then works in intermediate frequency band. It may also be digital and work in video frequency band.

The presence of a high-level parasitic component in the reception signal due to the echoes from fixed targets raises problems of saturation of the demodulator which gives the video signal and of the analog-digital converters used to enable digital processing with a view to the detection of the targets. It is therefore advantageous to eliminate or at least reduce the echoes from the fixed targets in the intermediate frequency.

One method used to eliminate the echoes from fixed targets in the intermediate frequency, described in the French patent application No. FR-A-2.687.479, consists in generating an intermediate frequency replica of the signal received in response to the first pulse of a burst. This is done by the sampling, after demodulation, of the amplitude of this signal measured according to a logarithmic scale and of its phase and by the synthesizing of the replica by amplitude and phase modulation of the intermediate frequency carrier by means of the samples obtained and the subtraction, in intermediate frequency band, of this replica from each of the signals received in response to the subsequent pulses of the burst.

This method of elimination of the echoes of fixed targets has the advantage of not using an analog delay line with a period equal to the pulse repetition period. Such a delay line is difficult to make and its insertion gives rise to phenomena of attenuation and distortion that are difficult to master. However, it may happen, in the presence of strong echoes from fixed targets, that there may be a certain degree of saturation giving rise to the formation of a fairly approximate replica at the first pulse of the burst.

The present invention is aimed at overcoming this drawback by forming the replica in response to the first pulse of a burst by making successive approximations by means of an iterative process based on a first sampling relating to the response to the first pulse and then a second sampling relating to the error that persists between the response to the first pulse and a temporary replica synchronized from the first pulse, and to a combination of the two samplings to prepare a more precise replica of the response to the first pulse.

SUMMARY OF THE INVENTION

An object of the invention is a method to eliminate the intermediate frequency echoes of fixed targets in a coherent pulse radar, wherein a replica of the response, in intermediate frequency band, to the first pulse of a burst is subtracted from the intermediate frequency response to each of the subsequent pulses of the burst. This method consists in:

carrying out a first sampling, after demodulation, of the amplitude in logarithmic scale and of the phase of the signal received in response to the first pulse of a burst and in carrying out a synthesis, in intermediate frequency band, of a rough replica of this signal, carrying out a subtraction, in intermediate frequency band, of the rough replica from the signal received in response to the first pulse delayed by the time needed to prepare the rough replica to obtain a modelling error signal, carrying out a second sampling, after demodulation, of the amplitude in logarithmic scale and of the phase of the modelling error signal, making a synthesis, from the first and second sampling operations, of a more precise replica, in intermediate frequency band, of the signal received in response to the first pulse of a burst, and subtracting this more precise replica from each of the signals received in response to the subsequent pulses of the burst.

The intermediate frequency synthesis of a more precise replica of the signal received in response to the first pulse of a burst may be done from a new series of amplitude and phase samples resulting from a combination of the samples of the signal received in response to the first pulse and the samples of the modelling error signal or by the addition of two separately synthesized components: the rough replica determined on the basis of the samples of the signal received in response to the first pulse of a burst and a corrective signal determined on the basis of the samples of the modelling error signal.

An object of the invention also relates to devices for the implementation of the above method.

BRIEF DESCRIPTION OF THE DRAWINGS

Other features and advantages of the invention shall emerge from the following description of embodiments given by way of an example. This description shall be made with reference to the appended drawing, wherein.

MORE DETAILED DESCRIPTION

Figure 1:
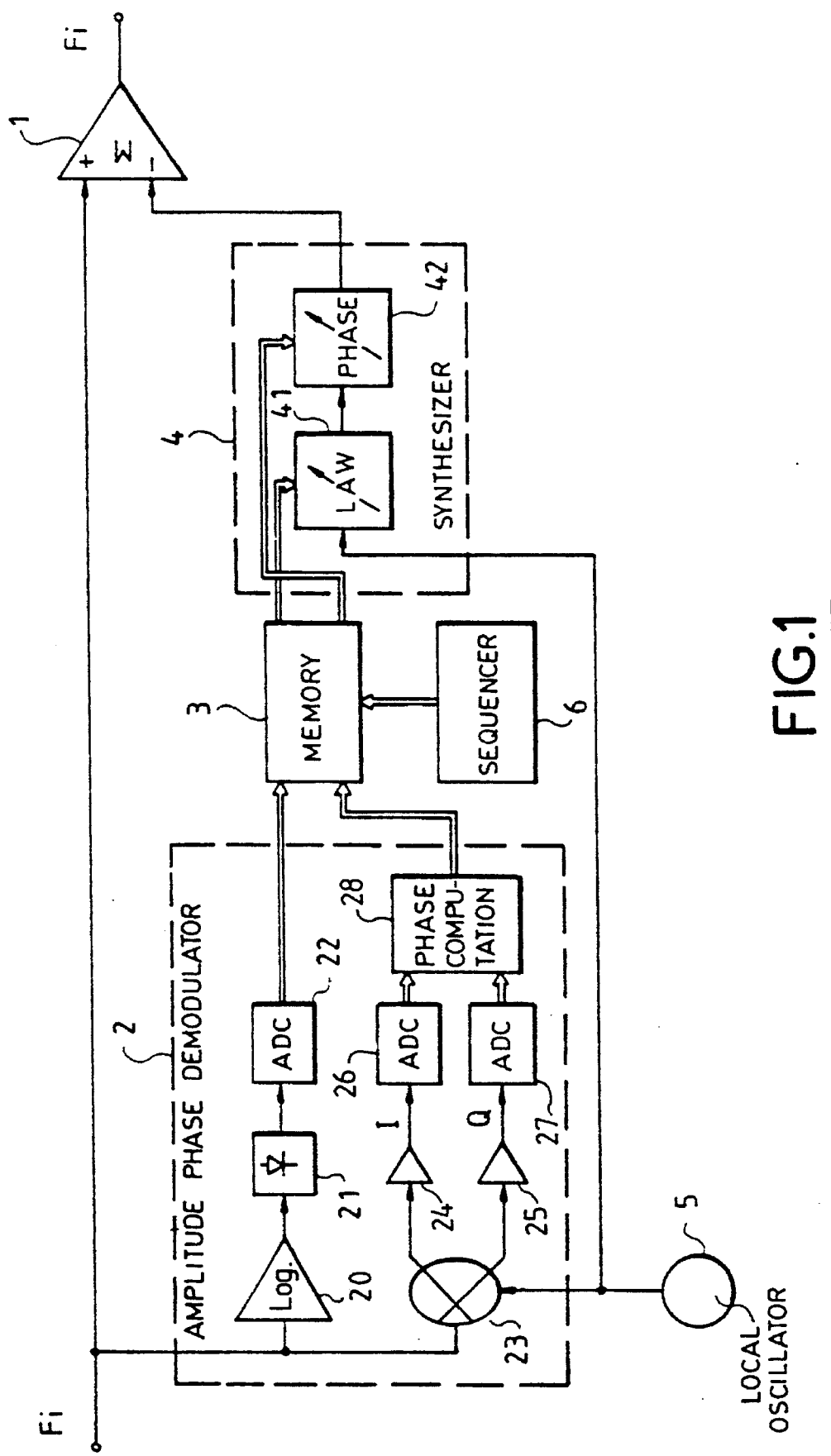
FIG. 1 shows a circuit for the elimination of intermediate frequency echoes from fixed targets with single cancellation of a known type.

FIG. 1 shows a block diagram of a circuit for the elimination of intermediate frequency echoes from fixed targets with single cancellation of a known type described in the French patent No. FR-A-2.687.479.

In this circuit for the elimination of fixed echoes, the reception signal of a radar sending out bursts of coherent pulses while it is operating in intermediate frequency band, namely it modulates a carrier around 60 MHz, is applied first of all directly to the additive input of a summator 1 and, secondly, by means of a system formed by an amplitude-phase demodulator 2, a memory 3 and a synthesizer 4, to the subtractive input of this same summator 1.

The system formed by the amplitude-phase demodulator 2, the memory 3 and the synthesizer 4 enables the synthesizing of an intermediate frequency replica of the signal received in response to the first pulse of a burst and the generation of this replica in synchronism with each of the responses to the subsequent pulses of the burst.

The summator 1 enables the subtraction, in intermediate frequency, from each of the responses to the pulses of a burst except for the first pulse of each burst, of a replica of the response in intermediate frequency to the first pulse. It enables this subtraction be done in such a way as to eliminate, from these responses, the component, invariant from pulse to pulse, that is due to the fixed targets.

The amplitude-phase demodulator 2 has an amplitude detection channel with a logarithmic amplifier 20 supplying an envelope detector 21 to which there is connected an analog-digital converter 22. The amplitude-phase demodulator 2 also has a phase detection channel formed by a demodulator 23 in quadrature, the phase and quadrature outputs of which are processed by separator amplifiers 24, 25 before being applied to the inputs of two analog-digital converters 26, 27 placed at the inputs of a phase computation circuit 28.

The use, in the amplitude detection channel, of a logarithmic amplifier makes it possible to have a wide dynamic range with a low-capacity analog-digital converter 22, for example a fast eight-bit converter working in oversampling mode.

In the phase detection channel, the demodulator 23 in quadrature receives an intermediate frequency carrier from a local oscillator 5, giving it a phase reference. The analog-digital converters 26, 27 are also low capacity analog-digital converters, for example fast 8-bit converters working in oversampling mode.

The phase computation circuit is a digital circuit, for example a read-only memory that gives the instantaneous phase of the signal demodulated in quadrature on the basis of the value of the arc tangent of the ratio of the amplitude of the signal of the quadrature channel to the amplitude of the signal of the in-phase channel.

The memory 3 works under the control of a sequencer 6 so as to store the succession of phase and amplitude samples of the demodulated signal received in response to the first pulse of each burst and deliver this succession of samples to the synthesizer 4 in synchronism with each of the responses to the subsequent pulses of the burst.

The synthesizer 4 has an adjustable attenuator 41 receiving the amplitude samples in logarithmic scale and an adjustable phase shifter 42 receiving phase samples. Both these devices work on the intermediate frequency carrier signal given by the local oscillator 5. The adjustable phase shifter may be a sine, cosine generator followed by a modulator in quadrature driven by the local oscillator 5 while the adjustable attenuator may be formed by a logarithmic amplifier controlled by a digital-analog converter.

With such a system, the cancellation of the fixed echoes is done in intermediate frequency band by means of a replica of the response to the first pulse of each burst stored in video band in the form of a set of pairs of samples of amplitude measured in logarithmic scale and of phase.

The storage of the replica to the first pulse of each burst in video band while it is subtracted in intermediate frequency band from each of the responses to the subsequent pulses of a burst enables a substantial diminishing of the sampling rate.

The use, for the storage in video band of the replica of the response to the first pulse of a burst, of a set of pairs of samples of amplitude measured in logarithmic scale and of phase, instead of pairs of samples of in-phase and quadrature components I and Q, makes it possible to obtain far lower sensitivity to the phenomena of saturation of the video signal. However, the replica defined by these samples is limited in amplitude and in precision of phase by the degree of precision of the analog-digital converters used. In the presence of strong echoes from fixed targets, it may happen that a fairly substantial error persists between the signal received in response to the first pulse of a burst and its replica.

To overcome this drawback, it is proposed to form the replica to the first pulse of a burst by carrying out successive approximations according to an iterative process. This process entails, first of all, a first sampling of the response to the first pulse of a burst and a synthesizing, on the basis of this first sampling, of a rough replica while at the same time bringing about a similar delay in the response to the first pulse by the period needed to prepare the rough replica. Then, in a second stage, a modelling error signal is prepared by subtraction of the rough replica to the delayed response to the first pulse. A second sampling is carried out relating to the modelling error signal and the two samplings are combined to set up a more precise replica of the response to the first pulse.

In this iterative process, the phenomenon of saturation which may appear during the phase of sampling of the response to the first pulse of a burst is highly attenuated during the phase of sampling of the modelling signal whose amplitude is appreciably lower.

Figure 2:
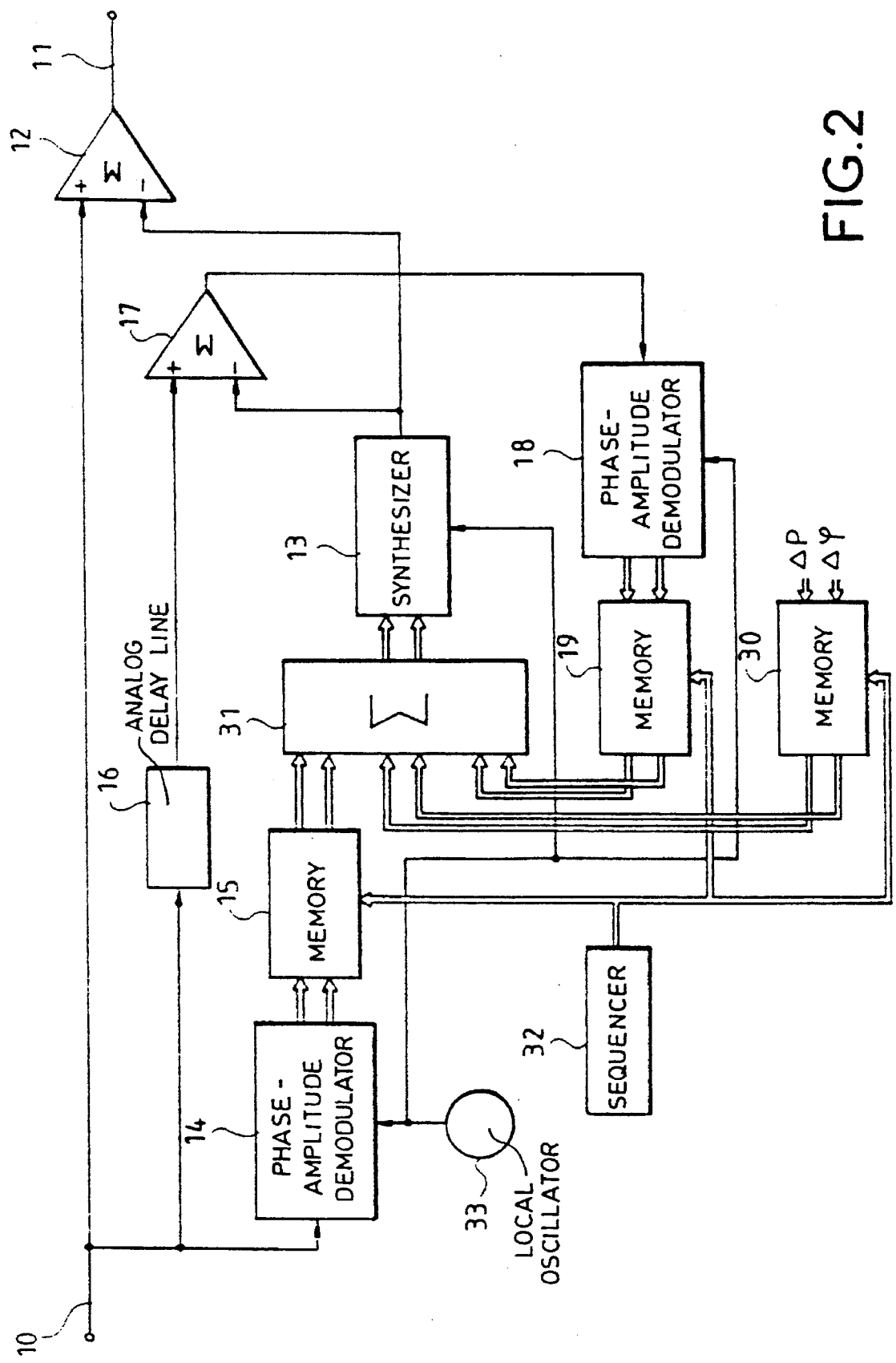
FIG. 2 shows a circuit for the elimination of intermediate frequency echoes from fixed targets with double cancellation according to the invention.

FIG. 2 shows a block diagram of a circuit for the elimination of the intermediate frequency echoes of fixed targets with double cancellation, implementing an iterative process such as this.

The reception signal of the radar, which is available in intermediate frequency band, is applied to the input 10 and is available after cancellation of the echoes from fixed targets at the output 11. From the input 10 onwards, it follows three parallel channels:

- a first channel taking it directly to the additive input of a first analog summator 12 which delivers the output signal 11 and receives, at a subtractive input, replicas of the received signal in intermediate frequency band in response to the first pulse of a burst synchronized with the responses to the subsequent pulses of the burst and prepared by a synthesizer 13 out of sequences of memorized samples of the amplitude and phase of the signal received in response to the first pulse of the burst that is demodulated in video band,

- a second channel leading, by means of an amplitude-phase demodulator 14, to a first memory 15 storing a sequence of pairs of samples of amplitude in logarithmic scale and of phase defining, in video band, a rough replica of the signal received in response to the first pulse of a burst, and

- a third channel leading, by means of an analog delay line 16, to the additive input of a second analog summator 17 which receives, at a subtractive input, the rough replica prepared by the synthesizer 13 and delivers, at output, a modelling error signal in intermediate frequency band.

The output of the second analog summator 17 is connected by means of a second amplitude-phase demodulator 18 to the input of a second memory 19 storing a sequence of pairs of samples of amplitude in logarithmic scale and of phase defining the modelling error signal in video band.

In addition to the first and second memories 15 and 19, the device has a third memory 30. This third memory 30 stores a sequence of pairs of amplitude samples $\alpha\rho$ in logarithmic scale and phase samples $\Delta\phi$. These samples define the amplitude and phase shifts of the demodulator of the radar amplitude-phase discriminator circuit that follows the fixed echo cancellation device and has not been shown. These amplitude and phase shifts are measured at reception of the radar noise in distance gates that are sufficiently distant for the echoes returning from the interrogation pulses to be negligible.

The three memories 15, 19 and 30 are connected at the data reading output to the inputs of the synthesizer 13 by means of a double summator 31 which adds together firstly the amplitude samples in taking account of their logarithmic scale, and secondly the phase samples. They are controlled by a sequencer 32 which carries out their writing and reading at appropriate moments with respect to the instants of transmission of the pulses forming the burst.

The two amplitude-phase demodulators 14, 18 have the same design as the demodulator 2 of the device of FIG. 1 with single cancellation of echoes from fixed targets. From a local oscillator 33, they receive an intermediate frequency carrier giving them a phase reference and delivering, at output, on two distinct channels, samples of amplitude in logarithmic scale and of phase of the signals applied to their inputs reduced to video band.

The synthesizer 13 too has the same design as the synthesizer 14 of the device of FIG. 1 with single cancellation of echoes from fixed targets. It carries out an amplitude and phase modulation of the signal from the local oscillator 33 in complying with the set values of amplitude and phase applied to its inputs.

The delay line 16 delays the signal received by the time, equal to some microseconds, required for its processing by the first amplitude-phase demodulator 14 and by the synthesizer 13 while the first memory 15 is read simultaneously with its recording. The delay enables the synchronizing, at the inputs of the second analog summator 17, of the received signal and its rough replica in order to compare them and prepare the modelling error signal.

The device with double cancellation of echoes from fixed targets that has just been described works as follows:

During the reception period following the first pulse of a burst, the amplitude and phase samples given by the amplitude-phase demodulator 14, which defines a rough signal received in response to the first pulse, are stored in the memory 15 and immediately sent to the synthesizer 13 by means of the double summator 31. This double summator 31 receives zero samples at its other inputs from the memories 19 and 30 whose reading is not permitted.

In response, the synthesizer 13 makes delivery, with a small delay equal to about one microsecond, of a rough replica. This rough replica is subtracted by the analog summator 17 from the response to the first pulse which is appropriately delayed in the delay line 16.

The result therefore, at output of the analog summator 17, is a modelling error signal in intermediate frequency band that is reduced to video band and sampled in amplitude and phase by the amplitude-phase demodulator 18 to be stored in this form in the memory 19.

The process of recording of the memories 15 and 19 is completed for the period of the burst some microseconds after the end of the signal received in response to the first pulse.

The recording in the memory 30 is done at the end of the burst after the extraction, from the remote distance compartments, of the mean values of amplitude shift and phase shift of the demodulator of the radar receiver.

After the transmission of the second pulse and of each subsequent pulse of the burst, the synthesizer 13 receives, from the double summator 31, a double summation of the sequences of amplitude and phase samples read in the memories 15, 19 and 30. It receives this double summation in such a way as to bring about the generation, in synchronism with each signal received in response to a pulse, of a more precise replica of the response to the first pulse assigned to the amplitude and phase shifts of the demodulator of the radar receiver, this more precise replica being subtracted from each signal received in response to a pulse by the analog summator 12.

Figure 3:
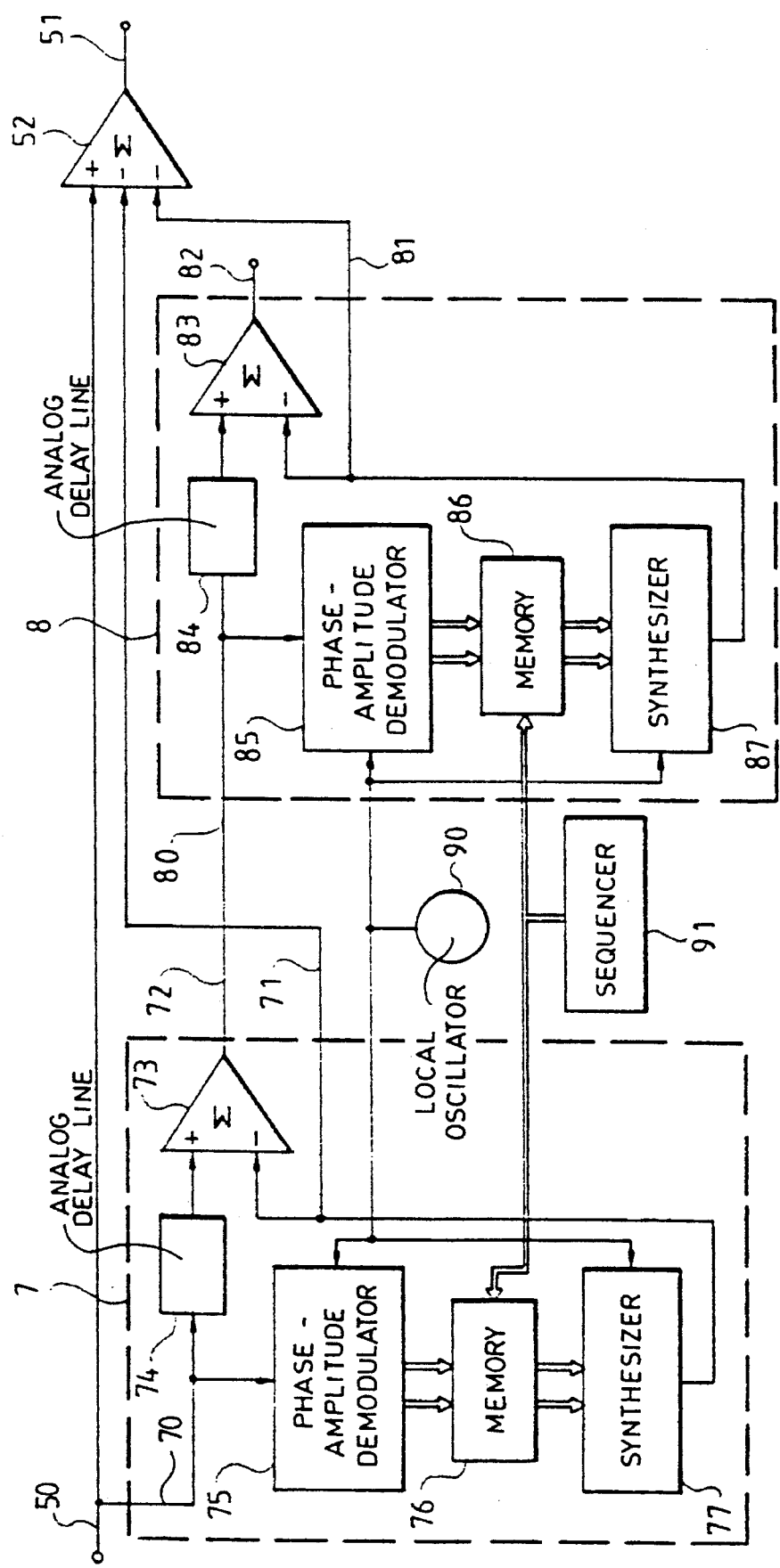
FIG. 3 shows another circuit for the elimination of intermediate frequency echoes from targets with double cancellation according to the invention.

FIG. 3 shows the block diagram of another circuit for the elimination of the intermediate frequency echoes from the fixed targets, with double cancellation resulting from the cascade connection of two identical circuits with single cancellation.

The reception signal of the radar, which is available in intermediate frequency band, is applied to the input 50 and is available after the cancellation of the echoes from the fixed targets at the output 51. From the input onwards, it follows two parallel channels:

- a first channel leading it directly to the additive input of a first analog summator 52 which, at two subtractive inputs, receives components that set up a model, by addition, of a replica of the signal received, in intermediate frequency band, in response to the first pulse of a burst, synchronized with the responses to the subsequent pulses of the burst and generated from two identical circuits 7 and 8 called single cancellation circuits, and

- a second channel where it carries out a cascade excitation of the single cancellation circuit 7 and 8 generating the components whose sum sets up a model of a replica of the signal received, in intermediate frequency band, in response to the first pulse of a burst.

Each single cancellation circuit 7, 8 has an input 70, 80 of signals to be modelled, an output 71, 81 of modelled signals and an output 72, 82 of modelling error signals.

The input 70, 80 of signals to be modelled is connected firstly to the additive input of an analog summator 73, 83 by means of an analog delay line 74, 84 compensating for the transit times and, secondly, to the subtractive input of this same analog summator 73, 83 by means of a sequence formed by an amplitude-phase demodulator 75, 85, a memory 76, 86 and a synthesizer 77, 87.

This sequence formed by the amplitude-phase demodulator 75, 85, the memory 76, 86 and the synthesizer 77, 87 enable the synthesizing, at the output of the signal to be modelled 71, 82, of a replica of the signal applied to the input 70, 80 and the repetition of this replica as desired.

The analog summator 73, 83 which receives both the signal to be modelled and its synchronized replica delivers a signal corresponding to the residue of modelling on the output 72, 82.

As above, the amplitude-phase demodulators 75, 85 have the same design as the amplitude-phase demodulator 2 of the device of FIG. 1 for the single cancellation of echoes from fixed targets. From a local oscillator 90, they receive an intermediate frequency carrier giving them a phase reference. At output they deliver, on two distinct channels, amplitude samples in logarithmic scale and phase samples of the signals applied to their inputs reduced to video band.

The synthesizers 77, 87 also have the same design as the synthesizer 4 of the device of FIG. 1 for the single cancellation of echoes from fixed targets. They carry out the amplitude and phase modulation of the signal from the local oscillator 90 in complying with the set values of amplitude and phase coming to them from the memory 76, 86.

Under the control of a sequencer 91, the memory 76, 86 stores a sequence of pairs of amplitude and phase samples coming from the amplitude-phase demodulator 75, 85 and corresponding to the period of reception of the response to the first pulse of a burst. The memory 76, 86 transmits this sequence immediately and periodically, in synchronism with the responses to the subsequent pulses of the burst, to the synthesizer 77, 87.

The first single-cancellation circuit 7, placed at the head, prepares a rough replica to the response to the first pulse of a burst at its output 71 and delivers a modelling error signal at its output 72. The second single-cancellation circuit 8 placed thereafter prepares a replica to the modelling error signal of the first single-cancellation circuit 7 and delivers a new modelling error signal designed for a possible third single-cancellation circuit. The rough replica synthesized by the first single-cancellation circuit 7 and the modulation error signal replica synthesized by the second single-cancellation circuit 8 are added up at the subtractive inputs of the analog summator 52 to form a more precise replica of the response to the first pulse of a burst and thus enable a cancellation of the echoes from the fixed targets that is better than with a single circuit.

The operation is as follows:

During the reception period following the first pulse of a burst, the amplitude and phase samples given by the amplitude-phase demodulator 75 which define a rough replica of the signal received in response to the first pulse are stored in the memory 76 and immediately transmitted to the synthesizer 77. In response, the synthesizer 77 delivers, with a small delay, of a rough replica that is subtracted by the analog summator 73 from the response to the first pulse appropriately delayed in the delay line 74. The result thereof, at output of the analog summator 73, is a modelling error signal that reaches the circuit 8 some microseconds after the start of the response to the first pulse of the burst.

This modelling error signal is reduced to video band and sampled in amplitude and phase by the amplitude-phase demodulator 85. Then its sequence of sample pairs is stored in the memory 86.

After the transmission of the second pulse of the burst and each subsequent pulse, the synthesizers 77 and 87 receive sequences of pairs of amplitude and phase samples read in the memories 76 and 86. The synthesizers 77 and 78 receive these sequences in such a way that, in synchronism with each signal received in response to a pulse, they generate a rough replica of the response to the first pulse and a corrective signal that get combined at the subtractive inputs of the analog summator 52 to form a more precise replica of the response to the first pulse synchronous with the responses to the subsequent pulses of the burst from which it is deducted.

The device that has just been described in relation to FIG. 3 is valuable in that it is designed around two identical single-cancellation circuits 7 and 8 and can therefore be easily implemented by means of single-cancellation circuits batch-produced in hybrid form and hence at lower cost.

What is claimed is:

1. A method to eliminate the intermediate frequency echoes of fixed targets in a coherent pulse radar, wherein a replica of the response, in intermediate frequency band, to the first pulse of a burst is subtracted from the intermediate frequency response to each of the subsequent pulses of the burst, wherein said method consists in:

carrying out a first sampling, after demodulation, of the amplitude in logarithmic scale and of the phase of the signal received in response to the first pulse of a burst and in carrying out a synthesis, in intermediate frequency band, of a rough replica of this signal, carrying out a subtraction, in intermediate frequency band, of the rough replica from the signal received in response to the first pulse delayed by the time needed to prepare the rough replica to obtain a modelling error signal, carrying out a second sampling, after demodulation, of the amplitude in logarithmic scale and of the phase of the modelling error signal, making a synthesis, from the first and second sampling operations, of a more precise replica, in intermediate frequency band, of the signal received in response to the first pulse of a burst, and subtracting this more precise replica from each of the signals received in response to the subsequent pulses of the burst.

2. A method according to claim 1, wherein the synthesis of the more precise replica on the basis of the first and second sampling operations consists in generating a third sampling by the addition of the samples of the same rank and same nature of the first and second samplings and in carrying out the amplitude and phase modulation of a carrier at the intermediate frequency by the sequence of samples of this third sampling.

3. A method according to claim 1, wherein the synthesis of the more precise replica from the first and second sampling operations consists in:

generating a rough replica by the amplitude and phase modulation of an intermediate frequency carrier by means of the sequence of samples of the first sampling, generating a modelling correction signal by the amplitude and phase modulation of an intermediate frequency carrier by means of the sequence of samples of the second sampling, and adding, in synchronism, the rough replica and the modelling correction signal.

4. A device to eliminate the intermediate frequency echoes in a coherent pulse radar comprising:

a first amplitude-phase demodulator giving samples of amplitude in logarithmic scale and of phase of the input signal of the device reduced to video band, a first memory carrying out the storage, under the control of a sequencer, of a sequence of samples coming from the first amplitude-phase demodulator corresponding to the signal received in response to the first pulse of a burst, a local oscillator giving an intermediate frequency carrier, a synthesizer capable of modulating the carrier of the local oscillator in amplitude and phase by means of a memorized sequence of amplitude and phase samples, a first analog summator that delivers the output signal of the device and has an additive input at which it receives the input signal of the device and a subtractive input at which it receives the output signal from the synthesizer, and said sequencer circuit controlling the memory for which it is recorded for the duration of the signal received in response to the first pulse of a burst and read in repetition for the duration of each of the pulses of a burst, wherein said device furthermore comprises:

a delay line connected to the input of the device delaying the received signal by the time needed for its processing by the first amplitude-phase demodulator and by the synthesizer, the first memory being read simultaneously with its recording, a second analog summator that has an additive input connected to the output of the delay line, a subtractive input connected to the output of the synthesizer and an output at which it delivers a modelling error signal, a second amplitude-phase demodulator that is connected at output to the second analog summator and delivers samples of amplitude in logarithmic scale and of phase of the modelling error signal reduced to video band, a second memory carrying out the storage, under the control of the sequencer circuit, of a sequence of samples coming from the second amplitude-phase demodulator for the duration of the signal received in response to the first pulse delayed by the period of the delay line, and a double summator interposed between the first and second memories and the synthesizer.

5. A device according to claim 4, furthermore comprising a third memory that receives mean values of amplitude and phase shift from the demodulator of the radar and is connected, in read mode, in parallel with the first and second memories at input of the double summator.

6. A device to eliminate the intermediate frequency echoes of fixed targets in a a coherent pulse radar comprising means to prepare a replica of the signal received, in intermediate frequency, in response to the first pulse of a burst and to repeat said replica in synchronism with the signals received, in intermediate frequency, in response to the pulses of a burst subsequent to the first burst, and means to subtract said replica from each of the signals received in intermediate frequency wherein, in order to prepare and repeat said replica, said device comprises a cascade of at least two identical circuits working by successive approximations giving a component of the replica, each of them being controlled by a local oscillator and a sequencer having an input of a signal to be modelled, a modelled signal output and a modelling error signal output by which they are cascade-connected, and comprising:

an amplitude-phase demodulator giving samples of amplitude in logarithmic scale and of phase of the signal applied to their input of a signal to be modelled reduced to video band, a memory controlled by the sequencer, storing a sequence of samples coming from the amplitude-phase demodulator for the duration of the signal received in response to the first pulse of a burst with a delay compensating for the propagation periods from circuit to circuit, a synthesizer capable of modulating the carrier of the local oscillator in amplitude and in phase by the sequence of samples stored in the memory and connected at output to the modelled signal output of the circuit, a delay line that is connected to the input of a signal to be modelled and that delays the signal to be modelled by the time needed for its processing by the amplitude-phase demodulator and the synthesizer, the memory being read simultaneously with its recording, and an analog summator with an additive input connected to the delay line, a subtractive input connected to the output of the synthesizer and an output connected to the modelling error signal output.

\* \* \* \* \*